US011074757B2

(12) United States Patent
Tomida (10) Patent No.: US 11,074,757 B2
(45) Date of Patent: Jul. 27, 2021

(54) DISPLAY DEVICE, DISPLAY METHOD, AND RECORDING MEDIUM

(71) Applicant: Casio Computer Co., Ltd., Tokyo (JP)

(72) Inventor: Takahiro Tomida, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 16/712,295

(22) Filed: Dec. 12, 2019

(65) Prior Publication Data

US 2020/0202631 A1 Jun. 25, 2020

(30) Foreign Application Priority Data

Dec. 19, 2018 (JP) ............................. JP2018-236969

(51) Int. Cl.
*G06T 19/00* (2011.01)
*G06T 7/70* (2017.01)
*G06F 3/01* (2006.01)
*G02B 30/27* (2020.01)
*G06T 7/50* (2017.01)

(52) U.S. Cl.
CPC ............ *G06T 19/006* (2013.01); *G02B 30/27* (2020.01); *G06F 3/013* (2013.01); *G06T 7/50* (2017.01); *G06T 7/70* (2017.01); *G06T 2200/24* (2013.01); *G06T 2207/30201* (2013.01)

(58) Field of Classification Search
None
See application file for complete search history.

(56) References Cited

U.S. PATENT DOCUMENTS

| 6,049,424 A * | 4/2000 | Hamagishi ............. G02B 30/27 359/464 |
| 6,980,363 B1 * | 12/2005 | Takagi ................. G02B 23/125 250/214 VT |
| 2004/0041747 A1 * | 3/2004 | Uehara ................ H04N 13/359 345/6 |
| 2012/0044330 A1 * | 2/2012 | Watanabe .............. G02B 30/26 348/54 |
| 2013/0169827 A1 * | 7/2013 | Santos ............... H04N 5/23229 348/207.1 |
| 2013/0321482 A1 * | 12/2013 | Goro .................... H04N 13/356 345/690 |

(Continued)

FOREIGN PATENT DOCUMENTS

| CN | 106461958 A | 2/2017 |
| JP | 2010-171573 A | 8/2010 |

(Continued)

OTHER PUBLICATIONS

Chinese Office Action dated Apr. 1, 2021, for the corresponding Chinese Patent Application No. 201911307348.4, 20 pages. (With English Translation).

*Primary Examiner* — Nurun N Flora
(74) *Attorney, Agent, or Firm* — Seed IP Law Group LLP (57) ABSTRACT

A display device includes a display panel, and a processor. The display panel displays an image. The processor acquires, as a display image, three-dimensional image data including data of a right-eye image and a left-eye image, and controls the display panel to display the right-eye image and the left-eye image. A distance between the right-eye image and the left-eye image displayed shifted on the display panel is substantially half a spacing between eyes of a user viewing the display panel.

15 Claims, 7 Drawing Sheets

(56) References Cited

U.S. PATENT DOCUMENTS

| | | | | |
|---|---|---|---|---|
| 2014/0063083 A1* | 3/2014 | Hamagishi | ............. | G09G 3/003 345/694 |
| 2014/0320614 A1* | 10/2014 | Gaudreau | ............. | G02B 30/27 348/51 |
| 2015/0268479 A1* | 9/2015 | Woodgate | ............ | G02B 6/0068 349/15 |
| 2016/0014389 A1* | 1/2016 | Ono | ..................... | H04N 13/128 348/47 |
| 2016/0191904 A1* | 6/2016 | An | ......................... | H04N 13/31 348/51 |
| 2018/0286065 A1* | 10/2018 | Knorr | .................... | G06T 7/579 |

FOREIGN PATENT DOCUMENTS

| | | |
|---|---|---|
| JP | 2013-132029 A | 7/2013 |
| JP | 2014-52512 A | 3/2014 |

* cited by examiner

DISPLAY DEVICE, DISPLAY METHOD, AND RECORDING MEDIUM

CROSS-REFERENCE TO RELATED APPLICATION

This application is based upon and claims the benefit of priority under 35 USC 119 of Japanese Patent Application No. 2018-236969 filed on Dec. 19, 2018, the entire disclosure of which, including the description, claims, drawings, and abstract, is incorporated herein by reference in its entirety.

FIELD

The present disclosure relates to a display device, a display method, and a recording medium.

BACKGROUND

Unexamined Japanese Patent Application Kokai Publication No. 2013-132029 describes a mirror device with a built-in display, having a one-way mirror and a display device disposed on the rear side of the one-way mirror.

Such a mirror device described in the aforementioned reference uses as a mirror the one-way mirror and displays a display image by a display device.

SUMMARY

According to one aspect of the present disclosure, a display device includes a display panel, and a processor. The display panel is configured to display an image. The processor is configured to acquire, as a display image, three-dimensional image data including data of a right-eye image and a left-eye image, and control the display panel to display the right-eye image and the left-eye image. A distance between the right-eye image and the left-eye image displayed shifted on the display panel is substantially half a spacing between eyes of a user viewing the display panel.

According to another aspect of the present disclosure, a display device includes a display panel, a light reflection and transmission member, and a processor. The display panel is configured to display an image. The light reflection and transmission member is placed over the display panel and is configured to reflect a portion of incident light and transmit another portion of incident light therethrough. The processor is configured to acquire three-dimensional image data as a display image, and control the display panel to display the three-dimensional image represented by the three-dimensional image data. The processor acquires the three-dimensional image data having an image focused on a position of a mirror image generated by the light reflection and transmission member.

According to yet another aspect of the present disclosure, a display method for a display device including a display panel configured to display an image is provided. The display method includes acquiring, as a display image, three-dimensional image data including data of a right-eye image and a left-eye image, and controlling the display panel to display the right-eye image and the left-eye image. A distance between the right-eye image and the left-eye image displayed shifted on the display panel is substantially half a spacing between eyes of a user viewing the display panel.

According to yet still another aspect of the present disclosure, a non-transitory computer-readable recording medium storing a program for execution in a computer for controlling a display device including a display panel configured to display an image is provided. The program causes the computer to execute instructions including acquiring, as a display image, three-dimensional image data including data of a right-eye image and a left-eye image, and controlling the display panel to display the right-eye image and the left-eye image. A distance between the right-eye image and the left-eye image displayed shifted on the display panel is substantially half a spacing between eyes of a user viewing the display panel.

BRIEF DESCRIPTION OF THE DRAWING

A more complete understanding of this application can be obtained when the following detailed description is considered in conjunction with the following drawings, in which.

DETAILED DESCRIPTION

A display device according to embodiments of the present disclosure is described hereinafter with reference to the drawings.

Figure 1:
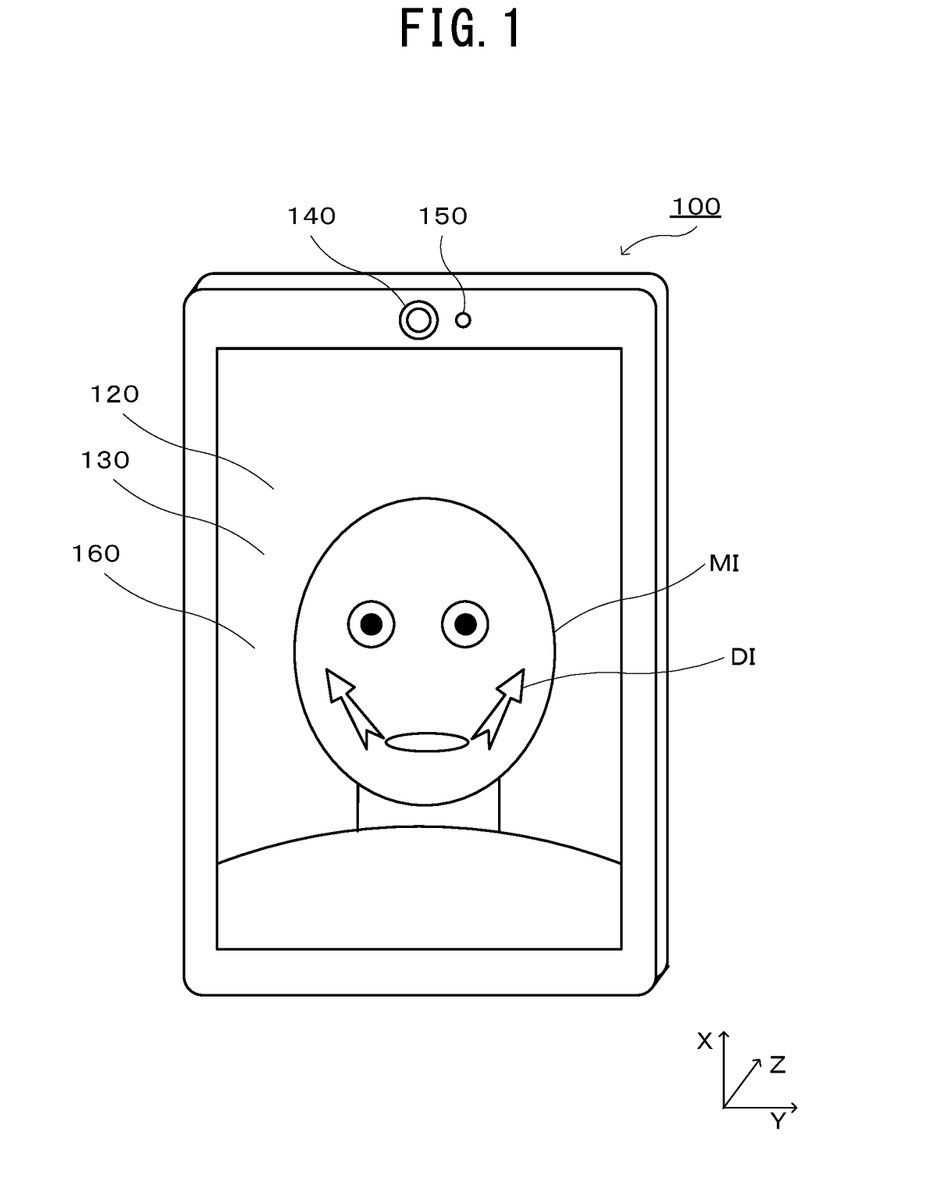
FIG. 1 is a drawing illustrating a display device according to an embodiment of the present disclosure.

As illustrated in FIG. 1, a display device 100 according to an embodiment of the present disclosure includes a display panel 120, a one-way mirror (light reflection and transmission member) 130 placed over the display panel 120, a camera 140, a distance sensor (distance measurer) 150, an operation receiver 160 placed over the display panel 120. The display device 100 displays on the display panel 120 a display image DI for guiding a viewer, a user U, for an aesthetic treatment to make a face smaller, a massage for making a smile face better, makeup, or the like by superimposition of the display image DI on a mirror image MI of the user U. When the user U sees the mirror image MI on the one-way mirror 130 and the display image DI displayed on the display panel 120, the user U can see the mirror image MI and the display image DI superimposed without misalignment. Here, the lengthwise direction of the display panel 120 is defined as an X-axis direction, the widthwise direction thereof is defined as a Y-axis direction, and the thickness direction thereof is defined as a Z-axis direction.

Figure 2:
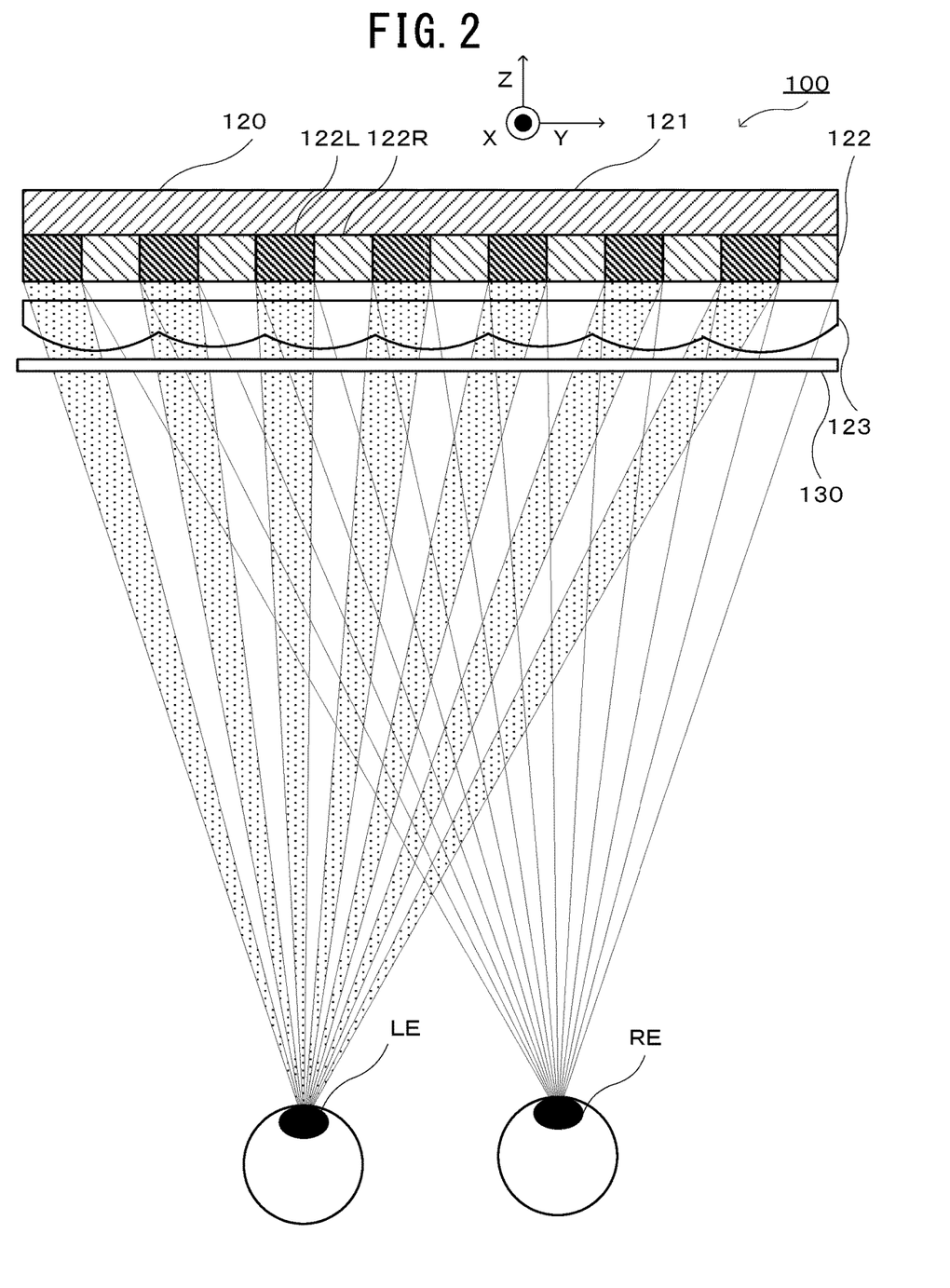
FIG. 2 is a cross-sectional view illustrating a display device according to an embodiment of the present disclosure.

The display panel 120, which is a panel for displaying images, is a glasses-free three-dimensional display that includes a backlight 121, a liquid crystal display (LCD) 122, and a lenticular sheet 123, as illustrated in FIG. 2. The backlight 121 has light emitting diodes (LEDs) and a light guide plate. The LCD 122 has left-eye pixel lines 122L extending in the X-axis direction and right-eye pixel lines 122R extending in the X-axis direction. Each left-eye pixel line 122L has groups of pixels arranged in the X-axis direction, and each group of pixels includes one red pixel, one blue pixel, and two green pixels. Each right-eye pixel line 122R has groups of pixels arranged in the X-axis direction, and each group of pixels includes one red pixel, one blue pixel, and two green pixels. Under control of a controller 110 described later, the left-eye pixel lines 122L provide representation of a left-eye image DLI and the right-eye pixel lines 122R provide representation of a right-eye image DRI. The lenticular sheet 123 is a sheet with an array of a number of convex lenses. The convex lenses have a D-shaped cross section and are arranged every two pixel lines, extending in the X-axis direction. The lenticular sheet 123 guides light emitted from the backlight 121, through the left-eye pixel lines 122L to a left eye LE and through the right-eye pixel lines 122R to a right eye RE. This enables the user U to see with the left eye LE the left-eye image DLI displayed on the left-eye pixel lines 122L and see with the right eye RE the right-eye image DRI displayed on the right-eye pixel lines 122R.

The one-way mirror 130 is placed over the display panel 120, and reflects a portion of incident light and transmits another portion of incident light therethrough. The one-way mirror 130 has a transparent plate such as a glass plate or a resin plate, and a reflective film disposed on one side of the transparent plate. The reflective film is a metal film such as an aluminum film, and is formed to have a thickness that allows a portion of incident light to be reflected on the reflective film and another portion of incident light to be transmitted therethrough. The one-way mirror 130 reflects a portion of incident light and transmits the light emitted from the display panel 120 therethrough, which enables the user U to see, when looking at the one-way mirror 130, the display image DI displayed on the display panel 120 being superimposed on the mirror image MI of the user U.

The camera 140 illustrated in FIG. 1 has a lens and an image capturing element, and captures an image of the user U and outputs image data indicating the captured image to the controller 110 described later.

The distance sensor 150 measures a distance from the display panel 120 to the user U, and outputs the distance data indicating the measured distance to the controller 110 described later. Examples of the distance sensor 150 include an infrared distance sensor and an ultrasonic distance sensor.

The operation receiver 160 receives, based on input of the user U, selection information of the display image DI to be displayed, instructions of start and end of the display process, and the like. The operation receiver 160 and the display panel 120 are components of a touch panel display device.

Figure 3:
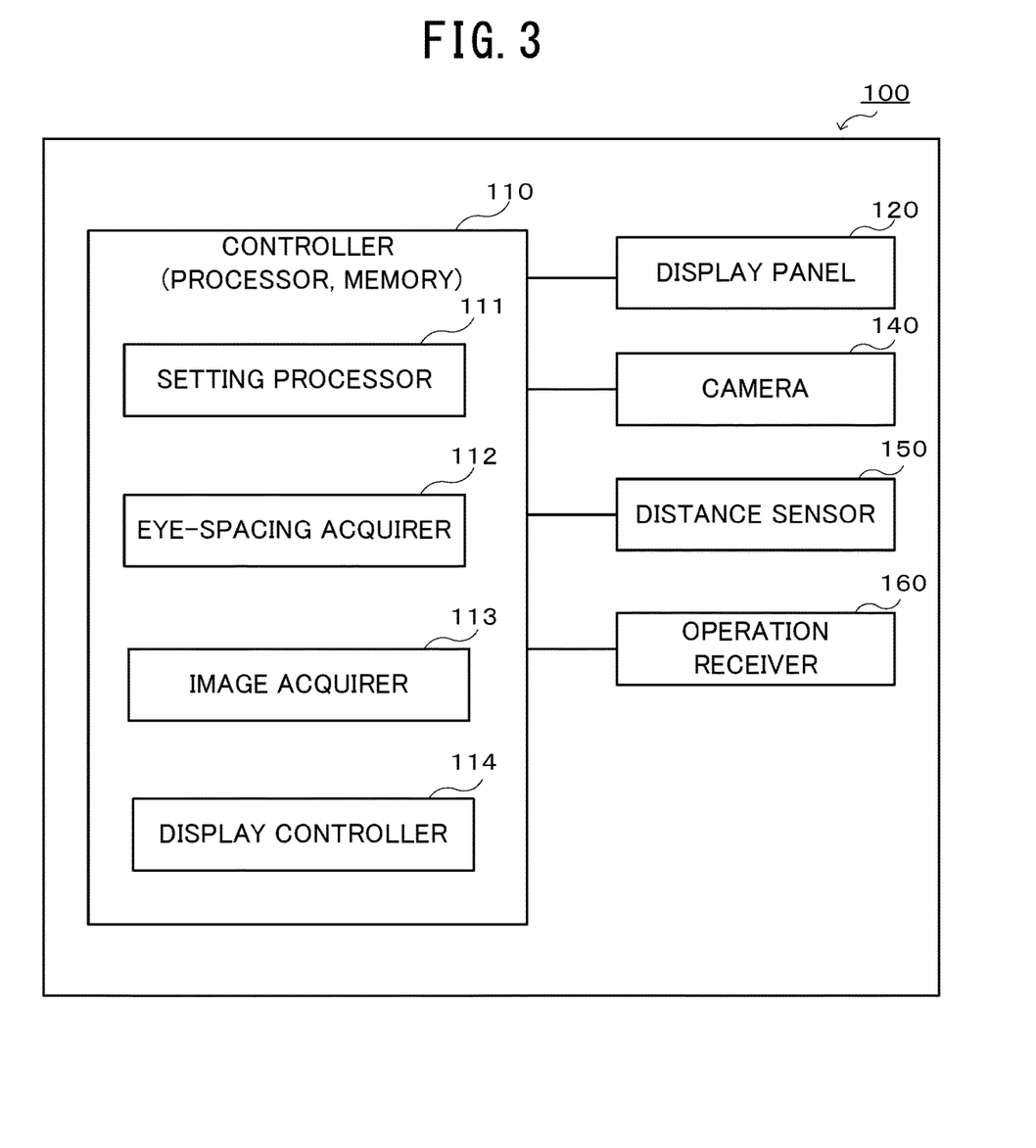
FIG. 3 is a block diagram illustrating a display device according to an embodiment of the present disclosure.

As illustrated in FIG. 3, the display device 100 includes, as electrical components, the controller 110 in addition to the display panel 120, the camera 140, the distance sensor 150, and the operation receiver 160 as described above.

The controller 110 includes a processor such as a central processing unit (CPU) and a memory such as a read only memory (ROM), a random access memory (RAM), and the like. The ROM includes a non-volatile memory, such as a flash memory or the like, and stores data including a program for the controller 110 to implement various functions, data relating to guidance information, and the like. The RAM includes a volatile memory, and is used for working area for the controller 110 to execute the program to perform various processes. The controller 110 functions, by executing the program stored in the ROM, as a setting processor 111, an eye-spacing acquirer 112, an image acquirer 113, and a display controller 114.

The setting processor 111 displays, via the display controller 114, a menu image including options for selecting contents of guidance on the display panel 120. The setting processor 111 receives a selection of guidance information via the operation receiver 160 from the user U having referred to the menu. The contents of guidance include an aesthetic treatment to make a face smaller (also hereinafter referred to as a "small face treatment"), a massage for making a smile face better (also hereinafter referred to as a "smile face massage"), makeup, or the like. For example, upon reception of a selection of the small face treatment, the display process is performed for guidance relating to the small face treatment. The small face treatment refers to treatments including a massage by the user U of his or her own face or other parts, such as a lymphatic massage to reduce swelling of face by lymph drainage massage.

The eye-spacing acquirer 112 acquires a spacing between eyes of the user U based on the image of the user U captured by the camera 140 and the distance from the display panel 120 to the user U measured by the distance sensor 150. The eye-spacing acquirer 112 extracts positional information of the eyes of the user U from the image captured by the camera 140 and detects a distance between the eyes on the image. The eye-spacing acquirer 112 acquires data indicating the spacing between the eyes of the user U based on the distance between the eyes on the detected image and the distance from the display panel 120 to the user U measured by the distance sensor 150.

The image acquirer 113 acquires data indicating the display image DI including the selected guidance information received by the setting processor 111, and acquires three-dimensional image data including the left-eye image DLI and the right-eye image DRI. The left-eye image DLI is an image obtained by shifting of the display image DI to the left by a reference amount, and the right-eye image DRI is an image obtained by shifting of the display image DI to the right by the reference amount. The reference amount is, on the display panel 120, substantially one-fourth of the spacing of the eyes acquired by the eye-spacing acquirer 112. For example, upon reception of the selection of the small face treatment by the setting processor 111, the image acquirer 113 acquires the display image DI for the guidance relating to the small face treatment illustrated in FIG. 1. The image acquirer 113 acquires three-dimensional image data including the left-eye image DLI obtained by shifting of the display image DI to the left by the reference amount, and the right-eye image DRI obtained by shifting of the display image DI to the right by the reference amount.

Figure 4:
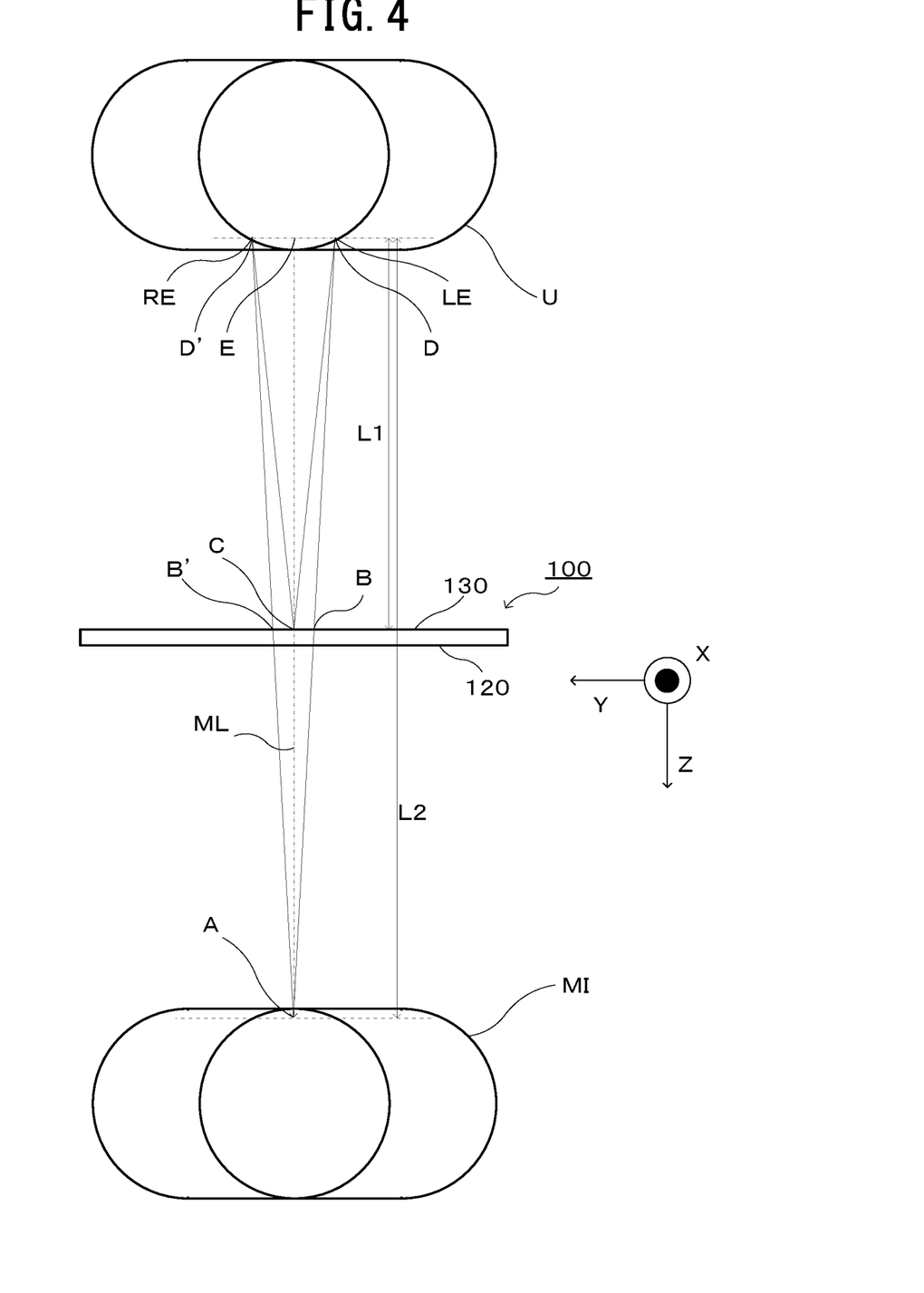
FIG. 4 is a drawing illustrating user's lines of sight with which the user views a display device according to an embodiment of the present disclosure.

When the user U looks into the one-way mirror 130 of the display device 100 and then sees the mirror image of herself or himself, the lines of sight of the left eye LE and the right eye RE cross at a position A where the user U can see the mirror image MI, as illustrated in FIG. 4. Here, let a line perpendicularly crossing from the user U to the display device 100 be a perpendicular line ML, let a position of crossing between the perpendicular line ML and the display device 100 be a position C, let a position of crossing between the display device 100 and a line connecting the left eye LE to the position A be a position B, let a position of the left eye LE be a position D, and let the center of the left eye LE and the right eye RE be a position E. Since $\angle BAC = \angle DAE$ and $\angle BCA = \angle DEA = 90°$, the triangle ABC is similar to the triangle ADE. In addition, let a distance between the user U and the display device 100 be a distance L1 and let a viewing distance between the user U and the mirror image MI be a distance L2. Since the mirror image MI is an image reflected by the one-way mirror 130, the relationship between the distances L1 and L2 can be written as L2=2×L1. Since the segment AC is given by AC=L2−L1=2×L1−L1=L1 and the segment AE is given by AE=L2=2×L1, then the relationship between the segments AB and AD can be written as AB=½× AD and the size of the triangle ABC is half the size of the triangle ADE. Accordingly, the length of the segment CB is half the length of the segment ED. Similarly, let a position of crossing between the display device 100 and a line connecting the right eye RE to the position A be a position B' and let the position of the right eye RE be a position D'. Then the length of the segment CB' is half the length of the segment ED'. When a three-dimensional image consisting of the left-eye image DLI, which is obtained by shifting by half the distance between the distance E and the left eye LE (substantially one-fourth of the spacing between the eyes), and the right-eye image DRI, which is obtained by shifting by half the distance between the distance E and the right eye RE (substantially one-fourth of the spacing between the eyes) is displayed, the same display image DI is displayed at the position B where the line of sight extending from the left eye LE to the position A crosses the display device 100 and at the position B' where the line of sight extending from the right eye RE to the position A crosses the display device 100. This can avoid misalignment between display image DI viewed with the left eye LE and the display image DI viewed with the right eye RE when the user U sees the mirror image MI. Here, substantially one-fourth of the spacing between the eyes includes an allowable viewable range not to cause misalignment of the left-eye image DLI and the right-eye image DRI relative to the mirror image MI when the user U sees the mirror image MI.

The display controller 114 displays on the display panel 120 the menu image including options for selecting contents of guidance on the display panel 120, and the left-eye image DLI and the right-eye image DRI acquired by the image acquirer 113 based on information relating to the image captured by the camera 140. Specifically, the display controller 114 adjusts, based on the position of the face of the user U shot by the camera 140, the positions to display the left-eye image DLI and the right-eye image DRI, and then displays the images.

Next, the display process executed by the display device 100 having the aforementioned configuration is described below.

Figure 5:
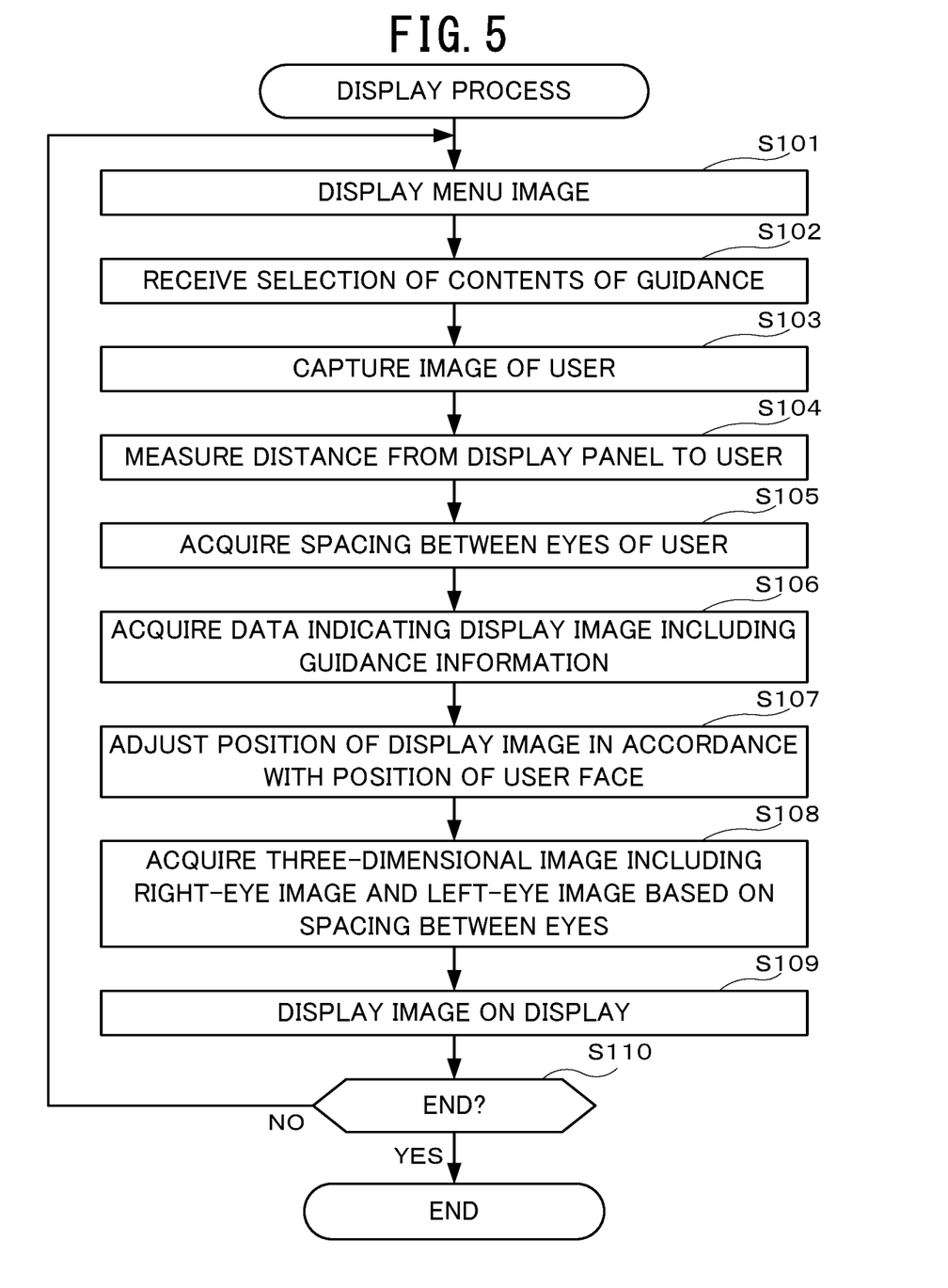
FIG. 5 is a flow chart illustrating a display process executed by a display device according to an embodiment of the present disclosure.

The display device 100 starts the display process illustrated in FIG. 5 in response to an instruction of the user U to start the process. Next, the display process executed by the display device 100 is described with the flow chart.

Upon start of the display process, the setting processor 111 displays, via the display controller 114, the menu image including options for selecting contents of guidance on the display panel 120 (Step S101). Examples of the contents of guidance include the small face treatment, the smile face massage, the makeup, and the like. Then the setting processor 111 receives a selection of the guidance information via the operation receiver 160 from the user U having referred to the menu (Step S102). For example, upon reception of the selection of the small face treatment, the display process is performed for guidance relating to the small face treatment.

Next, the eye-spacing acquirer 112 captures an image of the user U by the camera 140 (Step S103). Then the eye-spacing acquirer 112 acquires a distance from the display panel 120 to the user U measured by the distance sensor 150 (Step S104). The eye-spacing acquirer 112 then extracts positional information of the eyes of the user U from the captured image and detects a distance between the eyes on the image, and acquires a spacing between the eyes of the user U based on the distance between the eyes on the image and the distance from the display panel 120 to the user U measured by the distance sensor 150 (Step S105).

Next, the image acquirer 113 acquires data indicating the display image DI including the selected guidance information received by the setting processor 111 (Step S106). For example, upon reception of the selection of the small face treatment by the setting processor 111, the image acquirer 113 acquires the display image DI for the guidance relating to the small face treatment. Then the display controller 114 acquires an image of the user U captured by the camera 140 and adjusts the display position of the display image DI in accordance with the position of the face of the user U on the acquired image (Step S107). The image acquirer 113 then acquires, based on the spacing between the eyes acquired in Step S105, three-dimensional image data including data of the left-eye image DLI that is the display image DI shifted to the left and the right-eye image DRI that is the display image DI shifted to the right (Step S108).

Next, the display controller 114 displays on the display panel 120 the left-eye image DLI and the right-eye image DRI acquired in Step S108 (Step S109). Then the setting processor 111 determines whether an end instruction is received (Step S110). Upon determination that the end instruction is not received (No in Step S110), the steps S101 to S110 are repeated. Upon determination that the end instruction is received (Yes in Step S110), the display process ends.

Figure 6:
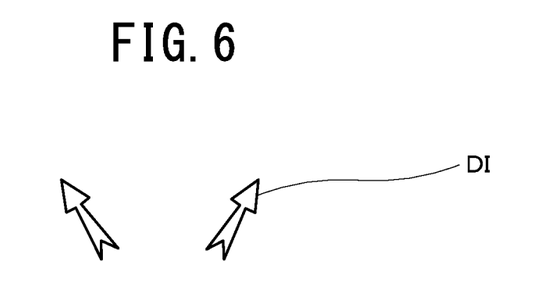
FIG. 6 is a drawing illustrating a display process executed by a display device according to an embodiment of the present disclosure.
Figure 7:
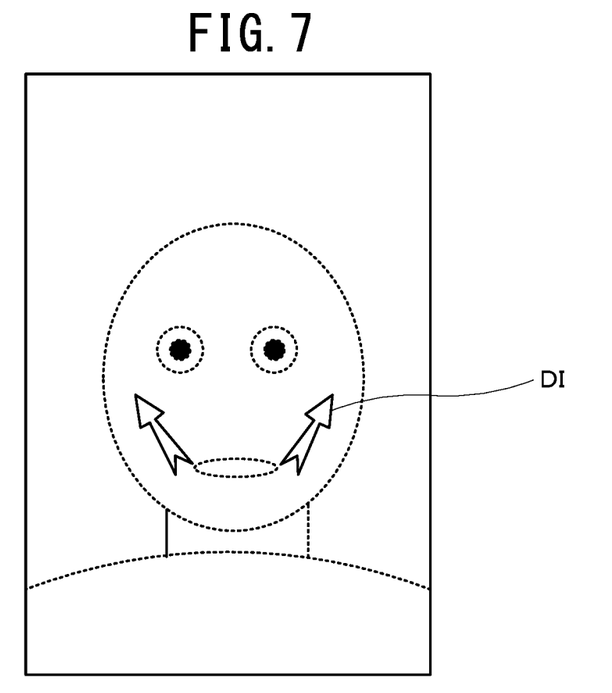
FIG. 7 is a drawing illustrating a display process executed by a display device according to an embodiment of the present disclosure.
Figure 8:
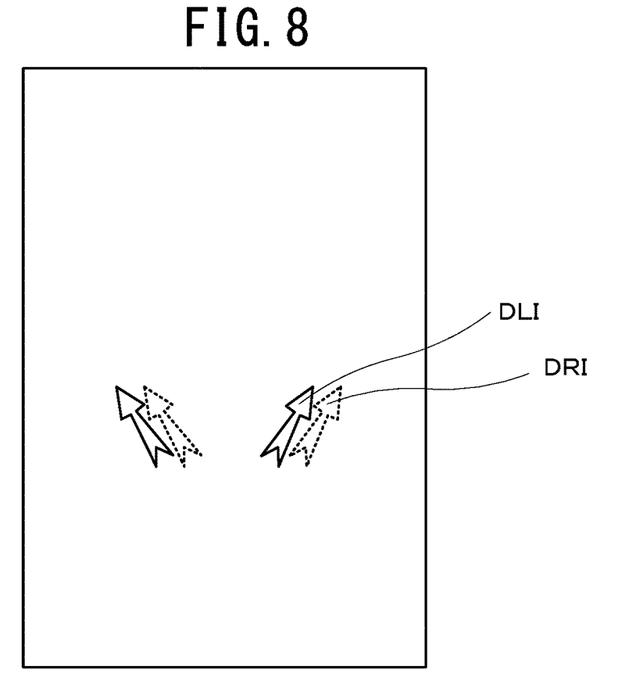
FIG. 8 is a drawing illustrating a display process executed by a display device according to an embodiment of the present disclosure.

Next, the display process executed by the display device 100 according to the embodiment is described based on a specific example with reference to FIGS. 6 to 8.

After the user U starts the display process, the setting processor 111 displays on the display panel 120 the menu image including options for selecting contents of guidance (Step S101 in FIG. 5). Examples of the contents of guidance include the small face treatment, the smile face massage, the makeup, and the like. When the user U having referred to the menu selects the small face treatment (Step S102 in FIG. 5), the display process is performed for the guidance relating to the small face treatment.

Next, the eye-spacing acquirer 112 captures an image of the user U by the camera 140 (Step S103 in FIG. 5), and acquires the distance from the display panel 120 to the user U measured by the distance sensor 150 (Step S104 in FIG. 5). The eye-spacing acquirer 112 then extracts the positional information of the eyes of the user U from the captured image and detects the distance between the eyes on the image, and acquires the spacing between the eyes of the user U based on the distance between the eyes on the image and the distance from the display panel 120 to the user U (Step S105 in FIG. 5).

Next, the image acquirer 113 acquires data indicating the display image DI, illustrated in FIG. 6, including the guidance information relating to the selected small face treatment received by the setting processor 111 (Step S106 in FIG. 5). This display image DI is an image for guidance of a lymphatic massage to reduce swelling of face by lymph drainage massage. Then as illustrated in FIG. 7, the display controller 114 acquires an image of the user U captured by the camera 140 and adjusts the display position of the display image DI in accordance with the position of the face of the user U on the acquired image (Step S107 in FIG. 5).

Then as illustrated in FIG. 8, the image acquirer 113 acquires three-dimensional image data including data of the left-eye image DLI that is the display image DI shifted to the left and the right-eye image DRI that is the display image DI shifted to the right based on the spacing between the eyes acquired in Step S105 (Step S108 in FIG. 5).

Next, the display controller 114 displays on the display panel 120 the left-eye image DLI and the right-eye image DRI acquired in Step S108 (Step S109 in FIG. 5). At this time, even if the user U sees the display image DI and the mirror image MI at the same time as illustrated in FIG. 1, the user U can see the display image DI without misalignment therebetween.

As described above, the display device 100 according to the embodiment displays the three-dimensional image consisting of the left-eye image DLI obtained by shifting to the left by substantially one-fourth of the spacing between the eyes and right-eye image DRI obtained by shifting to the right by substantially one-fourth of the spacing between the eyes. This provides the same display image DI to be displayed at the position B where the line of sight extending from the left eye LE to the position A crosses the display device 100 and at the position B' where the line of sight extending from the right eye RE to the position A crosses the display device 100, thereby avoiding misalignment between the display image DI viewed with the left eye LE and the display image DI viewed with the right eye RE when the user U sees the mirror image MI when the display image DI is displayed superimposed on the mirror image MI. Accordingly, the display device 100 of the present embodiment provides excellent viewability.

Figure 9:
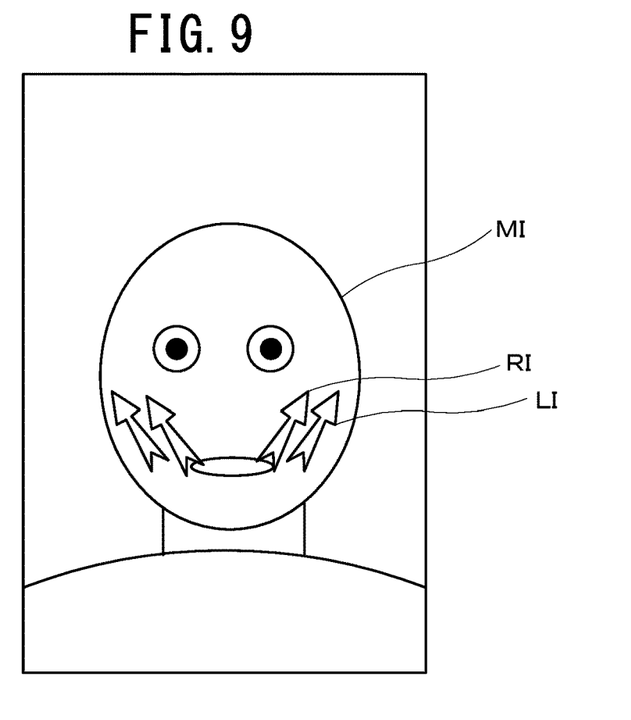
FIG. 9 is a drawing illustrating a display process executed by a display device according to a comparative example.

By contrast, as illustrated in FIG. 9, in a display device in which the image viewed with the left eye LE is the same as the image viewed with the right eye RE, when the image displayed by the display device and the mirror image MI reflected on the one-way mirror are viewed superimposed on each other, a phenomenon occurs in which the position RI of the image viewed with the right eye RE and the position LI of the image viewed with the left eye LE are visually misaligned relative to the mirror image MI due to binocular disparity when the view is focused on the mirror image MI. Thus the display device provides inferior viewability when the display image is displayed superimposed on the mirror image MI.

Variations

The display device 100 according to the aforementioned embodiment is described with an example in which the display panel 120 is a glasses-free three-dimensional display having a lenticular sheet 123. However, the three-dimensional display is not limited thereto as long as the image viewed with the right eye RE and the image viewed with the left eye LE can be displayed to differ from each other. For example, the three-dimensional display may be a glasses-free three-dimensional display having a parallax barrier or other glasses-free three-dimensional display. The three-dimensional display may be a display having an intended use of glasses such as polarized glasses or liquid crystal shutter glasses that enables the image viewed with the right eye RE and the image viewed with the left eye LE to be displayed to differ from each other.

The display device 100 according to the aforementioned embodiment is an example in which the one-way mirror 130 has a transparent plate such as a glass plate or a resin plate and a reflective film disposed on one side of the transparent plate. The one-way mirror 130 is not particularly limited thereto as long as it reflects a portion of incident light and transmits another portion of incident light therethrough.

The display device 100 according to the aforementioned embodiment is described with an example of displaying the display image DI that provides guidance for the small face treatment, the smile face massage, makeup, or the like, by superimposition of the display image DI on the mirror image MI of the user U. The display device 100 may be any display device that can display the display image DI superimposed on the mirror image MI, and may display, on the mirror image MI of the user U, the display image DI that shows clothing and decorative goods such as clothes, glasses, and hats. The display device 100 may display the display image DI that provides guidance for physical motion such as aerobics or dance. In this case, the display device 100 may have a size large enough for the user U to see a full-length figure thereon.

In the display device 100 according to the aforementioned embodiment, the eye-spacing acquirer 112 acquires a spacing between the eyes of the user U. The display device 100 may be any device that can display the left-eye image DLI and the right-eye image DRI without misalignment, and may display on the display panel 120 an input image for input of the spacing between eyes and receive information indicating the spacing between the eyes of the user U via the operation receiver 160 by the user U operation. The input image for input of the spacing between the eyes includes an input image for input of an amount (distance) of shift between the left-eye image DLI and the right-eye image DRI. In this case, while seeing the mirror image MI, the user U adjusts the spacing between the eyes or adjusts the amount (distance) of shift so as to avoid misalignment between the left-eye image DLI and the right-eye image DRI. The display device 100 may use, as the spacing between the eyes used for acquisition of the left-eye image DLI and the right-eye image DRI, an average value of the spacing between the eyes of a targeted type of users without the eye-spacing acquirer 112. Examples of the targeted type of users includes child, male adult, and female adult. In this case, the average value of the spacing between the eyes of the targeted type of users is stored beforehand in a ROM. For example, for the display device 100 for child use, the child's average value of the spacing between the eyes is stored beforehand in the ROM. In addition, the spacing between the eyes of each target type of the child, the male adult, the female adult, and the like may be stored beforehand in the ROM so as to be switched depending on each user U.

The display device 100 according to the aforementioned embodiment is described with an example in which the three-dimensional image includes data of the left-eye image DLI obtained by shifting to the left by substantially one-fourth of the spacing between the eyes and the right-eye image DRI obtained by shifting to the right by substantially one-fourth of the spacing between the eyes. The display device 100 may be any display device that can avoid misalignment of the left-eye image DLI and the right-eye image DRI, and an amount (distance) of shift between the left-eye image DLI and the right-eye image DRI on the display panel 120 may be substantially half the spacing between the eyes. In this case, the right-eye image DRI may be displayed shifted by substantially half the spacing between the eyes from the left-eye image DLI, with the left-eye image DLI fixed. Alternatively, the left-eye image DLI may be displayed shifted by substantially half the spacing between the eyes from the right-eye image DRI, with the right-eye image DRI fixed. Here, substantially half the spacing between the eyes includes an allowable viewable range not to cause misalignment of the left-eye image DLI and the right-eye image DRI relative to the mirror image MI when the user U sees the mirror image MI.

The display device 100 according to the aforementioned embodiment is described with an example in which the mirror image MI and the display image DI are displayed without misalignment therebetween using displaying of the left-eye image DLI and the right-eye image DRI. The display device 100 may be any display device that can display the mirror image MI and the display image DI without misalignment, and the image acquirer 113 may acquire a three-dimensional image having an image focused at a distance corresponding to the distance L2 (distance at which the mirror image MI can be perceived by the user U) that is a distance from the mirror image MI generated by the one-way mirror 130 to the user U, as illustrated in FIG. 4. That is, the image acquirer 113 may acquire the three-dimensional image having an image focused at a distance corresponding to the distance L2 between the user U and an imaginary position where the mirror image MI exists that is generated by the one-way mirror 130 and viewed in a depth direction of the one-way mirror 130. Alternatively, the image acquirer 113 may acquire three-dimensional image data having an image focused at a position of the mirror image MI that is generated by the one-way mirror 130 and can be perceived by the user, as illustrated in FIG. 4. For example, the display device 100 may display an image focused at a distance corresponding to the distance L2 between the mirror image MI and the user U by irradiation of the retinas of the user U with laser light from the display panel 120. Alternatively, the display device 100 may display the mirror image MI and the display image DI without misalignment by displaying the three-dimensional image using a phenomenon in which air is excited into plasma to emit light at a focal point where laser light converges.

The display device 100 according to the aforementioned embodiment acquires the spacing between the eyes of the user U based on the image of the user U captured by the camera 140 and the distance L1 from the display panel 120 to the user U measured by the distance sensor 150. However, the distance L1 from the display panel 120 to the user U may be specified based on the focal length that is when the image of the user U is captured by the camera 140. That is, the camera 140 may have functions of image capturing means and distance measurer. In such a case, a configuration of the distance sensor 150 in the aforementioned embodiment can be omitted.

A main part of the transmission and the printing process performed by the display device 100, which include the CPU, the RAM, and the ROM, may be realized not by a dedicated system, but can be executed using a general personal digital assistant (a smartphone, a tablet personal computer (PC), etc.), a personal computer, or the like, without use of a dedicated system. For example, an information terminal that executes the aforementioned processes may be realized by storing a computer program for executing the aforementioned operations in a computer-readable recording medium, such as a flexible disc, a compact disc read only memory (CD-ROM), a digital versatile disc read only memory (DVD-ROM), for distribution and installing the computer program into the personal digital assistant or the like. An information processing device may be configured, for example, by the general personal digital assistant or the like downloading the computer program stored in a storage included in a server device on a communication network, such as the Internet.

For example, in a case in which the functions of the display device 100 are shared by an operating system (OS) and an application program or performed in cooperation between the OS and the application program, just the application program of those may be stored in a recording medium or a storage device.

The computer program may be superimposed on a carrier wave, and then may be distributed via a communication network. For example, this computer program may be posted to a bulletin board system (BBS) on a communication network, and may be distributed via the network. Then the computer program may be started and executed under control of an OS in the same manner as other application programs to execute the aforementioned processes.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A display device comprising:
    a display panel configured to display an image;
    a light reflection and transmission member placed over the display panel and configured to reflect a portion of incident light and transmit another portion of incident light therethrough; and
    a processor configured to
      acquire, as a display image, three-dimensional image data including data of a right-eye image and a left-eye image, the display image including guidance information that is displayed superimposed on a mirror image on the light reflection and transmission member, and
      control the display panel to display the right-eye image and the left-eye image and the display image including the guidance information,
    wherein a distance between the right-eye image and the left-eye image displayed shifted on the display panel is substantially half a spacing between eyes of a user viewing the display panel.

2. The display device according to claim 1, wherein the processor acquires three-dimensional image data including data of the right-eye image and the left-eye image, the right-eye image being obtained by shifting of the display image on the display panel to the right by substantially one-fourth of the spacing between the eyes of the user, the left-eye image being obtained by shifting of the display image on the display panel to the left by substantially one-fourth of the spacing between the eyes of the user.

3. The display device according to claim 1, further comprising:
    a camera configured to capture an image of the user,
    wherein the processor controls the display panel to display the right-eye image and the left-eye image based on information relating to an captured image that is captured by the camera.

4. The display device according to claim 1, further comprising:
    a camera configured to capture an image of the user; and
    a distance measurer configured to measure a distance from the display panel to the user,
    wherein the processor acquires a spacing between eyes of the user based on the image of the user captured by the camera and the distance from the display panel to the user measured by the distance measurer.

5. The display device according to claim 1, wherein the processor receives, by a user operation, information indicating the spacing between the eyes of the user.

6. A display device comprising:
a display panel configured to display an image;
a light reflection and transmission member placed over the display panel and configured to reflect a portion of incident light and transmit another portion of incident light therethrough; and
a processor configured to
acquire three-dimensional image data as a display image, and
control the display panel to display the three-dimensional image represented by the three-dimensional image data,
wherein the processor acquires the three-dimensional image data having an image focused on a position of a mirror image generated by the light reflection and transmission member.

7. The display device according to claim 6, wherein the processor acquires three-dimensional image data including data of a right-eye image and a left-eye image, the right-eye image being obtained by shifting of the display image on the display panel to the right by substantially one-fourth of a spacing between eyes of a user, the left-eye image being obtained by shifting of the display image on the display panel to the left by substantially one-fourth of the spacing between the eyes of the user.

8. The display device according to claim 6, further comprising:
a camera configured to capture an image of a user,
wherein the processor controls the display panel to display the three-dimensional image data based on information relating to a captured image that is captured by the camera.

9. The display device according to claim 7, further comprising:
a camera configured to capture an image of the user; and
a distance measurer configured to measure a distance from the display panel to the user,
wherein the processor acquires a spacing between eyes of the user based on the image of the user captured by the camera and the distance from the display panel to the user measured by the distance measurer.

10. The display device according to claim 7, wherein the processor receives, by a user operation, information indicating the spacing between the eyes of the user.

11. The display device according to claim 6, wherein
the processor acquires the display image including guidance information that is displayed superimposed on an mirror image on the light reflection and transmission member, and
the processor controls the display panel to display the display image.

12. A display method for a display device including a display panel configured to display an image and a light reflection and transmission member placed over the display panel and configured to reflect a portion of incident light and transmit another portion of incident light therethrough, the display method comprising:
acquiring, as a display image, three-dimensional image data including data of a right-eye image and a left-eye image, the display image including guidance information that is displayed superimposed on a mirror image on the light reflection and transmission member; and
controlling the display panel to display the right-eye image and the left-eye image and the display image including the guidance information,
wherein a distance between the right-eye image and the left-eye image displayed shifted on the display panel is substantially half a spacing between eyes of a user viewing the display panel.

13. A non-transitory computer-readable recording medium storing a program for execution in a computer for controlling a display device including a display panel configured to display an image and a light reflection and transmission member placed over the display panel and configured to reflect a portion of incident light and transmit another portion of incident light therethrough, the program causing the computer to execute instructions comprising:
acquiring, as a display image, three-dimensional image data including data of a right-eye image and a left-eye image, the display image including guidance information that is displayed superimposed on a mirror image on the light reflection and transmission member; and
controlling the display panel to display the right-eye image and the left-eye image and the display image including the guidance information,
wherein a distance between the right-eye image and the left-eye image displayed shifted on the display panel is substantially half a spacing between eyes of a user viewing the display panel.

14. A display method for a display device including a display panel configured to display an image and a light reflection and transmission member placed over the display panel and configured to reflect a portion of incident light and transmit another portion of incident light therethrough, the display method comprising:
acquiring, as a display image, three-dimensional image data; and
controlling the display panel to display the three-dimensional image represented by the three-dimensional image data,
wherein the three-dimensional image data having an image focused on a position of a mirror image generated by the light reflection and transmission member is acquired.

15. A non-transitory computer-readable recording medium storing a program for execution in a computer for controlling a display device including a display panel configured to display an image and a light reflection and transmission member placed over the display panel and configured to reflect a portion of incident light and transmit another portion of incident light therethrough, the program causing the computer to execute instructions comprising:
acquiring, as a display image, three-dimensional image data; and
controlling the display panel to display the three-dimensional image represented by the three-dimensional image data,
wherein the three-dimensional image data having an image focused on a position of a mirror image generated by the light reflection and transmission member is acquired.

* * * * *